March 11, 1958  E. B. FURTON  2,826,455
DUSTPROOF CAP FOR FLUID DISPENSING NOZZLES
Filed July 10, 1956  2 Sheets-Sheet 1
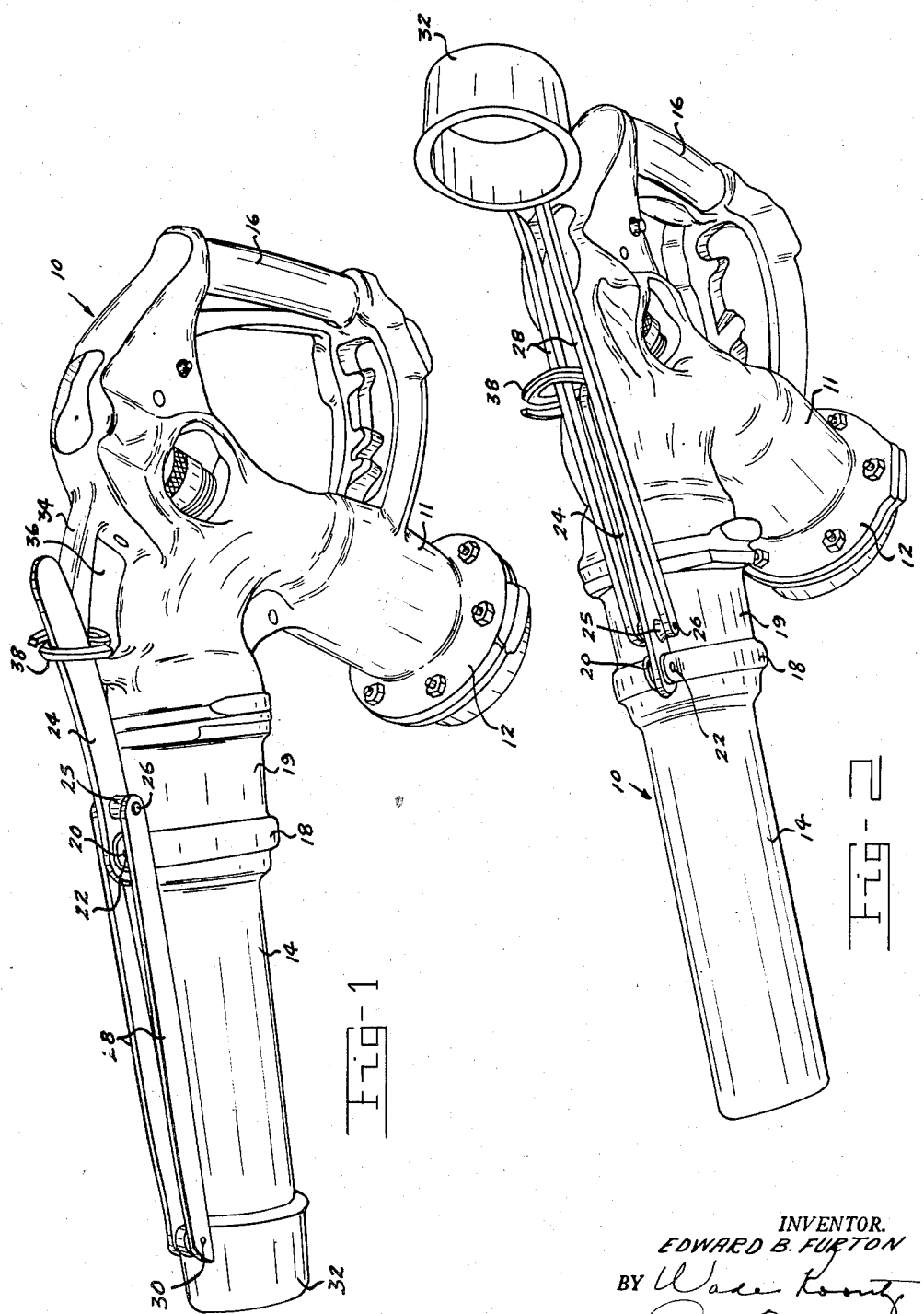
INVENTOR.
EDWARD B. FURTON
BY
ATTORNEYS March 11, 1958  E. B. FURTON  2,826,455
DUSTPROOF CAP FOR FLUID DISPENSING NOZZLES
Filed July 10, 1956  2 Sheets-Sheet 2

INVENTOR.
EDWARD B. FURTON
BY
ATTORNEYS

United States Patent Office 2,826,455
Patented Mar. 11, 1958

2,826,455

DUSTPROOF CAP FOR FLUID DISPENSING NOZZLES

Edward B. Furton, Edwards Air Force Base, Calif.

Application July 10, 1956, Serial No. 597,054

5 Claims. (Cl. 299—112)

(Granted under Title 35, U. S. Code (1952), sec. 266)

The invention described herein may be manufactured and used by or for the United States Government for governmental purposes without payment to me of any royalty thereon.

This invention relates to a dust cap for fluid dispensing nozzles and, more particularly, to a device for locking a dust cap in position over the end of the nozzle and keeping it attached to the nozzle when removed.

In servicing equipment, particularly, servicing where dust-free gasoline must be delivered to fuel cells of aircraft, service nozzles must be provided with protecting caps. A need has arisen for more satisfactory means to keep the dust cap from being lost. When no attaching means is used, the cap is easily lost or dropped into the fuel tank.

In devices in current use where some sort of permanent attachment of the cap to the nozzle is employed, the cap is secured to the nozzle by means of a cord or chain or spring. The cap is removed by the operator, by hand, and dangles loosely about while the nozzle is in use, and then is manually replaced when the service operation is completed. The loose cap, dangling about, interferes with the operator. It may become entangled in the equipment or cause damage to equipment and aircraft. The attaching means may break and the cap become lost or fall into a fuel cell.

The object of the present invention is the provision of a device which obviates all of these difficulties by providing a cap, which is securely locked over the end of the nozzle when no fluid is being dispensed, and is securely and positively held in a position which does not hamper the operator during the servicing operation.

A further object of the invention is the provision of a device wherein the cap is positively moved from one position to another by eccentric lever means, eliminating all dangling and inconvenient unnecessary movements.

A further object of the invention is the provision of a device which is rugged, economical to manufacture, positive in operation, and easy to operate.

Other objects and advantages will appear as the description proceeds.

In the drawing:

Fig. 1 is a perspective view of the device with the cap in closing position on the end of the service nozzle.

Fig. 2 is a perspective view of the device with the cap removed from the end of the nozzle, retracted, and held firmly in a position where it cannot hamper the operator.

Fig. 3 is a side elevation of the device showing the cap in nozzle closing position and an intermediate position shown in phantom.

Figure 7:
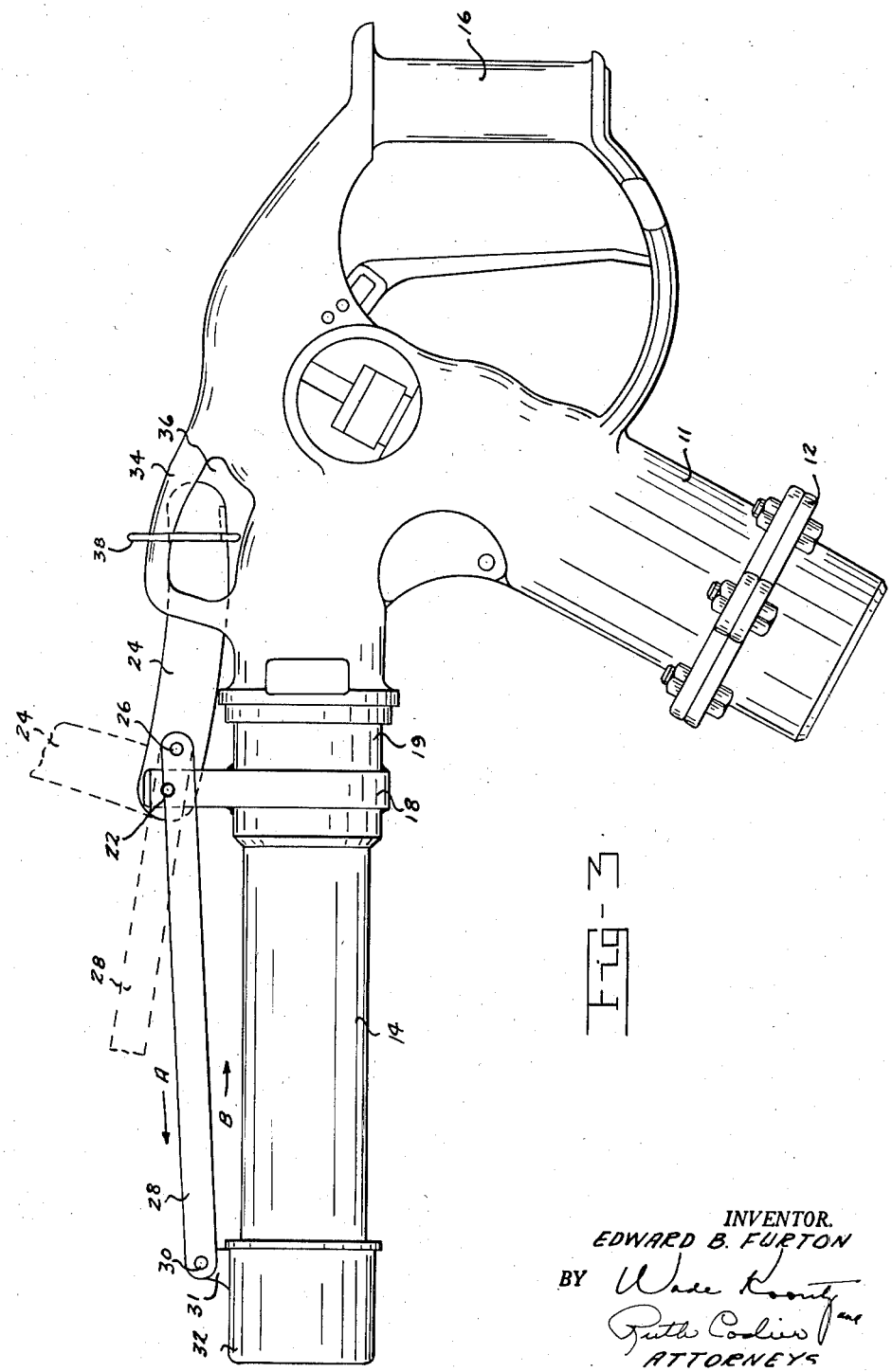

Referring more in detail to the drawing: a standard Air Force fuel service nozzle is indicated generally at 10. The invention is adaptable for use on other forms of nozzles where gasoline, or in fact, any type of fluid is dispensed.

The nozzle comprises a valve body and is composed of standard parts: A fuel inlet portion 11 is secured to a fluid source by any suitable means such as the collar and bolts, indicated generally at 12; a dispensing outlet tube or nozzle 14 positioned at an angle thereto on the order of 45°; and a valve operating handle 16.

A collar clamp 18 is braised, or otherwise secured around the outlet tube adapter to the nozzle between the dispensing tube and the handle. The collar clamp 18 is provided with a pair of ears 20. A pin 22 passes through the ears 20 and through a point near the end of an operating arm or handle 24. This operating arm may be curved throughout a portion of its length at an angle of the order of 10°. The pin 22 forms a stationary pivot.

A pin 26 passes through the operating arm 24 at a distance from its end, and transversely through the ends of two parallel links 28, one on either side of the handle 24. The pin 26 forms a moving pivot. A pair of washers, bushings, spools or other suitable bearing elements 25 may be interposed, one between the handle 24 and each of the links or rods 28. The rods 28 are substantially parallel and are pivoted at 30 to a protruding lug 31 formed on a cup or cap 32.

The nozzle body 10 contains an arm portion 34 which bridges an orifice 36. A safety hook 38 is secured to the bridge or arm portion 34, either temporarily snapped into place, permanently attached or otherwise secured.

It will be seen that all parts of the device are fastened to the nozzle body 10 and are thus insured against loss or damage.

The operation of the device is as follows: When the nozzle is not being used for service, the dust cap remains securely locked on the end of the nozzle. The dispensing portion of the nozzle remains entirely free of dust or dirt regardless of conditions. The operating lever or locking arm 24 remains in the position shown in Fig. 3, and is held in this position by the safety hook 38.

Unlocking the cup and removing it from the dispensing tube is accomplished by first freeing the arm 24 from the hook 38, then raising it. The pivot 26 is raised and moved forward by an eccentric movement, impelling the link 28 axially in the direction of the arrow A in Fig. 3, and pushing the cap 32 from the end of the dispensing tube 14. If the nozzle tube is held slightly downward, the cap 32 swings by gravity on the pivot 30 and the cap 32 swings free.

The whole operation is accomplished by a forward and backward movement of the operating arm 24 about the stationary pivot 20, through an arc of approximately 180°. When the arm 24 reaches the links 28 it assumes a position between them, and the whole assembly consisting of arm 24 and links 28 is then raised together and brought backward into the position shown in Figure 2. The hook 38 is slid into engagement with one of the arms 28 so that the whole of the operating assembly is held securely in position out of the operator's way.

The closing of the device, i. e., the replacement of the cap on the end of the dispensing tube is accomplished by reversal of the process. The safety hook is released; the whole assembly swung over the pivot 22 then lowered to lie parallel to the tube 10. The cap 32 is swung by gravity over the nozzle orifice of the tube. The handle arm is then raised, swung back over the pivot 22 into the locking position shown in Fig. 1. This causes the arms 28 to be drawn back in the direction of the arrow B in Fig. 3 and the cap drawn tightly onto the end of the tube, thus completely closing and protecting the orifice therein against the entrance of dust, dirt, or other foreign matter.

While the invention is shown and described in connection with one form for illustration, rather than restrictive purposes, it is obvious that minor changes and modifications may be made by those skilled in the art without departing from the scope and spirit of the invention as defined in the accompanying claims.

I claim:

1. A fluid dispensing nozzle for dispensing gasoline and similar fluids comprising a valve body, a fluid inlet portion in said valve body, a dispensing outlet tube secured to said valve body and communicating with said inlet portion through said valve body, a protective cap for covering the dispensing end of said outlet tube, means for placing said cap in position over said end of said outlet tube and for removing said cap from said position to a position out of the area of operator interference, said means comprising a pair of spaced parallel links, an operating arm positioned between said links, a pivotal connection between an end of said arm and said outlet tube, a pivotal connection between an end of each of said links and said arm at a point spaced from said end of said arm, a pivotal connection between the remaining ends of said links and said cap, said arm being operable to move said links in a longitudinal direction to remove said cap from said dispensing end of said outlet tube during the first portion of the uncapping operation and to lie between and travel arcuately with said links about said first mentioned pivotal connection during the remainder of said uncapping operation.

2. The combination set forth in claim 1 further including means for holding said links, said arm and said cap securely in position in either capped or uncapped position.

3. The combination set forth in claim 2 in which said means for holding comprises a hook attached to said valve body.

4. A fluid dispensing nozzle for dispensing gasoline and similar fluids comprising a valve body, a fluid inlet portion in said valve body, a dispensing outlet tube secured to said valve body and communicating with said inlet portion through said valve body, a protective cap for covering the dispensing end of said outlet tube, means for placing said cap in position over said end of said outlet tube and for removing said cap from said position to a position out of the area of operator interference, said means comprising a pair of spaced, parallel links, an operating arm positioned between said links, a pivotal connection between an end of said arm and said outlet tube, a pivotal connection between an end of each of said links and said arm at a point spaced from said end of said arm, a pivotal connection between the remaining ends of said links and said cap, said arm being operable to move said links in a longitudinal direction to remove said cap from said dispensing end of said outlet during the first portion of the uncapping operation and to lie between and travel arcuately with said links about said first mentioned pivotal connection during the remainder of said uncapping operation, said valve body being provided with an orifice defined in part by an arm portion and means attached to said arm portion for holding said links, said arm and said cap securely in position in either capped or uncapped position.

5. The combination set forth in claim 4 in which said last-named means comprises a hook.

References Cited in the file of this patent

UNITED STATES PATENTS

| | | |
|---|---|---|
| 224,118 | Warwick | Feb. 3, 1880 |
| 583,966 | Wupper et al. | June 8, 1897 |
| 788,128 | Andersson | Apr. 25, 1905 |
| 1,714,102 | Neil | May 21, 1929 |

FOREIGN PATENTS

| | | |
|---|---|---|
| 1,067,260 | France | Jan. 27, 1954 |